United States Patent
Lastinger et al.

(10) Patent No.: US 6,552,661 B1
(45) Date of Patent: Apr. 22, 2003

(54) ZONE BASED RADIO FREQUENCY IDENTIFICATION

(75) Inventors: Roc A. Lastinger, Mesa, AZ (US); John J. Coulthard, Scottsdale, AZ (US); Steve Koerner, Mesa, AZ (US)

(73) Assignee: RF Code, Inc., Mesa, AZ (US)

( * ) Notice: Subject to any disclaimer, the term of this patent is extended or adjusted under 35 U.S.C. 154(b) by 131 days.

(21) Appl. No.: 09/648,409

(22) Filed: Aug. 25, 2000

(51) Int. Cl.[7] .............................................. G08B 13/14
(52) U.S. Cl. ........................ 340/572.1; 340/573.4; 340/825.49; 342/44; 342/450; 455/67.1; 455/440; 455/443; 455/444
(58) Field of Search ....................... 340/572.1, 572.2, 340/573.4, 572.4, 10.1, 10.2, 10.4, 10.31, 10.32, 825.49, 10.51; 375/219; 235/385; 342/44, 47, 450, 457, 458, 459, 463; 705/28; 455/67.1, 440, 442, 443, 444

(56) References Cited

U.S. PATENT DOCUMENTS

| | | | |
|---|---|---|---|
| 3,906,166 A | * 9/1975 | Cooper et al. ............... 455/437 |
| 4,112,421 A | 9/1978 | Freeny, Jr. .................. 342/457 |
| 4,550,443 A | * 10/1985 | Freeburg ..................... 455/422 |
| 4,636,950 A | * 1/1987 | Caswell et al. ................ 705/28 |
| 4,656,463 A | 4/1987 | Anders et al. ............ 340/573.4 |
| 4,688,026 A | 8/1987 | Scribner et al. ............. 235/385 |
| 4,827,395 A | 5/1989 | Anders et al. .................. 700/9 |
| 4,843,622 A | * 6/1989 | Yotsutani et al. ........... 455/456 |
| 5,528,232 A | 6/1996 | Verma et al. ........... 340/825.49 |
| 5,565,858 A | 10/1996 | Guthrie ..................... 340/10.33 |
| 5,627,517 A | 5/1997 | Theimer et al. .......... 340/572.1 |
| 5,631,642 A | 5/1997 | Brockelsby et al. ......... 340/493 |
| 5,686,902 A | * 11/1997 | Reis et al. ................... 340/10.1 |
| 5,734,977 A | * 3/1998 | Sanmugam .................. 455/410 |
| 5,793,324 A | * 8/1998 | Aslanidis et al. ............. 342/51 |
| 5,822,714 A | 10/1998 | Cato ............................ 702/108 |
| 5,844,522 A | * 12/1998 | Sheffer et al. ............... 342/457 |
| 5,870,029 A | * 2/1999 | Otto et al. ............. 340/825.36 |
| 5,920,261 A | * 7/1999 | Hughes et al. ........... 340/568.8 |
| 6,040,774 A | * 3/2000 | Schepps ................... 340/572.1 |
| 6,097,301 A | * 8/2000 | Tuttle ....................... 340/693.9 |
| 6,456,239 B1 | 9/2002 | Werb et al. .................. 342/463 |

* cited by examiner

Primary Examiner—Benjamin C. Lee
(74) Attorney, Agent, or Firm—William R. Bachand; Squire, Sanders & Dempsey L.L.P.

(57) ABSTRACT

A locator according to various aspects of the present invention includes a receiver and a processor. The receiver receives several signals, each signal having respective indicia of identification device presence within a respective communication pattern. The processor performs a method for determining whether a first identification device is located within a zone. The method includes the following steps performed in any order. A first step of determining, in response to receiver signals, a respective reliability of communication between the receiver and a plurality of identification devices. The plurality includes the first identification device and at least one second identification device. A first and a second communication pattern each respectively has a periphery such that communication with a provided identification device when located beyond the periphery is less reliable than communication with the provided identification device when located within the periphery. The first identification device is located within the periphery of the first pattern. Each second identification device is located beyond the periphery of the first pattern and within the periphery of the second pattern. And, the first pattern has a periphery substantially within the zone. A second step of comparing each respective reliability of communication to a respective threshold to identify validly present identification devices. And, a third step of determining that the first identification device is within the zone in accordance with whether the first identification device is validly present within the first pattern, the second identification device is validly present within the second pattern, and the second identification device is not validly present within the first pattern.

22 Claims, 6 Drawing Sheets

ZONE BASED RADIO FREQUENCY IDENTIFICATION

FIELD OF THE INVENTION

Embodiments of the present invention relate to systems and methods for detecting the presence, location, and/or identity of objects bearing radio frequency identification devices.

BACKGROUND OF THE INVENTION

Radio frequency identification (RFID) devices have been used in systems for tracking persons, animals, and objects of a wide variety including for example airline baggage, inventory, and the mail. When a large number of objects to be tracked are located in a common area, it may be desirable to locate the object that is identified by the system. Conventional systems lack sufficient accuracy to report the distance from a reference point to the desired object.

Without the present invention, searches of wide areas for items that have been identified by radio frequency identification consume time and use labor ineffectively. Inventory management using RFID devices, if improved to include object position reporting, would find wider application and thereby help reduce overhead costs in a variety of security, manufacturing, husbandry, and materials handling environments.

SUMMARY OF THE INVENTION

A locator according to various aspects of the present invention includes a receiver and a processor. The receiver receives several signals, each signal having respective indicia of identification device presence within a respective communication pattern. The processor performs a method for determining whether a first identification device is located within a zone. The method includes the following steps performed in any order. A first step of determining, in response to receiver signals, a respective reliability of communication between the receiver and a plurality of identification devices. The plurality includes the first identification device and at least one second identification device. A first and a second communication pattern each respectively has a periphery such that communication with a provided identification device when located beyond the periphery is less reliable than communication with the provided identification device when located within the periphery. The first identification device is located within the periphery of the first pattern. Each second identification device is located beyond the periphery of the first pattern and within the periphery of the second pattern. And, the first pattern has a periphery substantially within the zone. A second step of comparing each respective reliability of communication to a respective threshold to identify validly present identification devices. And, a third step of determining that the first identification device is within the zone in accordance with whether the first identification device is validly present within the first pattern, the second identification device is validly present within the second pattern, and the second identification device is not validly present within the first pattern.

A method, according to various aspects of the present invention, for determining whether a first identification device is located within a zone, includes the following steps in any order. A first step of operating a portable locator within the zone to determine a respective reliability of communication between the locator and a plurality of identification devices, the plurality comprising the first identification device and at least one second identification device. The first identification device is located within a periphery of a first communication pattern. Each second identification device is located beyond the periphery of the first communication pattern and within the periphery of a second communication pattern. The first and the second communication pattern each respectively has a periphery such that communication with a provided identification device that is physically located beyond the periphery is less reliable than communication with a provided identification device that is physically located within the periphery. And, the first communication pattern has a periphery substantially within the zone. A second step of comparing reliability of communication with an identification device via a first communication pattern and reliability of communication with the identification device via a second communication pattern to provide a result of comparison. And, a third step of indicating, in response to the result of comparison, that operation via the first pattern is within the zone.

A locator, according to various aspects of the present invention, includes a receiver and a processor. The receiver provides a signal having indicia of identification device presence within a communication pattern. The processor performs a method for determining whether operation of a portable locator is within a zone. The method includes the following steps performed in any order. A first step of comparing reliability of communication with an identification device via a first communication pattern and reliability of communication with the identification device via a second communication pattern to provide a result of comparison. And, a second step of indicating, in response to the result of comparison, that operation via the first pattern is within the zone. The first and the second communication pattern each respectively has a periphery such that communication with a provided identification device that is physically located beyond the periphery is less reliable than communication with a provided identification device that is physically located within the periphery. The first communication pattern has a periphery substantially within the zone. And the identification device is located beyond the periphery of the first pattern and within the periphery of the second pattern.

A method, according to various aspects of the present invention, for determining whether operation of a portable locator is within a zone, includes the following steps performed in any order. A first step of comparing reliability of communication with an identification device via a first communication pattern and reliability of communication with the identification device via a second communication pattern to provide a result of comparison. And, a second step of indicating, in response to the result of comparison, that operation via the first pattern is within the zone. The first and the second communication pattern each respectively has a periphery such that communication with a provided identification device that is physically located beyond the periphery is less reliable than communication with a provided identification device that is physically located within the periphery. The first communication pattern has a periphery substantially within the zone. And, the identification device is located beyond the periphery of the first pattern and within the periphery of the second pattern.

A method, according to various aspects of the present invention, for preparing for zone-based communication, such communication using a portable locator, includes the following steps performed in any order for each zone. A first step of determining a respective set of locations comprising at least one location, each respective location for operating the locator within the zone. All points within the zone being on at least one respective line of sight from at least one location of the set of locations. And, a second step of determining a respective set of communication pattern pairs comprising at least one pattern pair. Each pair respectively comprises a first pattern and a second pattern. Each respective pattern, operative with the locator, has a periphery such that communication with a provided identification device that is physically located beyond the periphery is less reliable than communication with a provided identification device that is physically located within the periphery. And, each respective first pattern has a periphery substantially within the zone. And a third step for each pattern pair, of placing at least one identification device beyond the periphery of the first pattern and within the periphery of the second pattern.

By using two patterns, one within and one outside the zone, the boundary of the zone and hence the location of the responder may be more accurately determined. When the determination of presence within a pattern is based on measurements of reliability of communication, in contrast to using only a single detection event, zone boundaries may be defined in otherwise difficult communication environments. By locating at least one identification device, also herein called a responder or marker, outside the zone, it can be determined whether operation of a locator is at a designated operating location; and the location of a lost or misplaced object having an attached identification device is presently located within the zone.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

Figure 1:
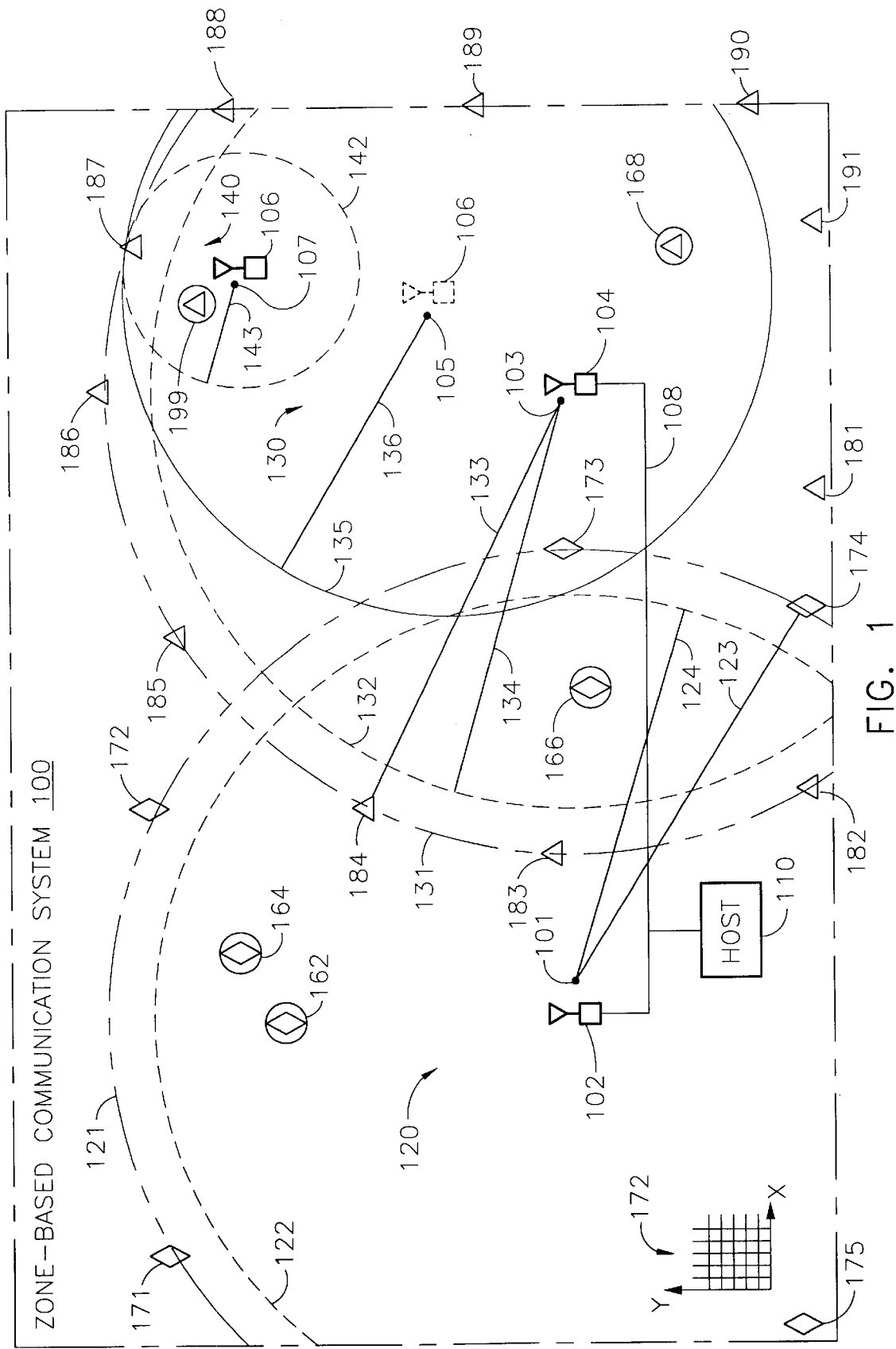
FIG. 1 is a functional block diagram of a system according to various aspects of present invention.

A system for object identification and location, according to various aspects of the present invention may perform zone-based communication in a facility (e.g., building, container, vehicle, ship, train, office, warehouse, highway, yard, portions thereof, or combinations thereof) for locating a desired (e.g., lost or misplaced) identification device that may be within the geographic bounds defining the facility. Zone-based communication generally includes one or more locators (e.g., interrogators, monitors, locators, or probes) and a multiplicity of identification devices. Generally, at least one identification device is attached to each item to be tracked (e.g., object, person, animal) through one or more zones. Locators may be operated at fixed points in relation to the zones or may be portable so as to be operated at arbitrary locations and at designated locations to determine the location of the desired identification device (and hence the desired object, person, or animal).

Zone-based communication facilitates identifying the presence of objects in a zone and the determination of the location of an object. A system, according to various aspects of the present invention, provides communication between a locator and an object, while the locator and object are within communicating range. Each object includes an identification device having an antenna used for communication. Communication, as used herein, may be used to accomplish one or more purposes including: (a) to detect presence of an identification device (e.g., to locate an object as in a zone), (b) to provide operative power to an identification device, (c) to determine an identification device identification, (e) to receive data from an identification device, or (f) to send data to one or more identification devices. Transmitted power levels may vary according to the range suitable for the communication. For example, objects may be detected at a comparatively lower transmitted power level to avoid collisions (e.g., simultaneous transmission of different signals). Communication may be accomplished using the same or different media, frequencies, or modulations for different purposes (e.g., magnetic induction, radio, infrared light, or acoustics using amplitude modulation, frequency shift keyed modulation, or pulse code modulation, to name a few representative alternatives). Different media, frequencies, or modulations may be used simultaneously or at different times for the same purpose. According to various aspects of the present invention, communication is established, overcoming the problems described above including variation in the orientation of each object antenna, variation in coupling among object antennas, and variation in discontinuities along a communication path (e.g., proximity of object antennas to surfaces that may interfere with communication by reflection, absorption, or refraction). Communication may be initiated by the locator (e.g., for providing power or detecting passive identification devices; or for interrogating); or initiated by the identification device (e.g., a beacon type device).

For example, object identification and location system 100 includes host computer 110, network 108, locators 102, 104, and 106 (representative of any number of locators coupled to network 108), and identification devices (162 through 191) (representative of any number and orientation of identification devices).

Host computer 110 may include any computer system having computing capacity and interfaces for supporting data communication on network 108 among one or more locators 102, 104, and 106. A conventional office computer system may be used. Host computer 110 may operate to receive notice of objects detected or identified by one or more locators 102, 104, and 106 and to conduct any otherwise conventional business process in response to such notice. As a representative example, host computer may provide inventory accounting, point of sale services, materials handling, automatic data collection, electronic article surveillance, or electronic access control in response to object detection or identification where objects may include personnel badges, identification tags, transportation tags, inventory labels, electronic keys, authorization devices, or price tags.

Network 108 may include any network for data transfer (e.g., an internet, an intranet, a wide area network, or a local area network; and may use cable, telephony, or wireless technology) between a locator and a host computer. In addition, network 108 may support data transfer between one or more locators 102, 104, and 106. Any conventional network protocol may be used, for example a protocol that includes messages for assigning processing tasks among monitors that operate in parallel (e.g., independently or redundantly) or in cooperation (e.g., sharing control information or computed results). The coupling of a portable locator 106 to network 108 (not shown) is preferably via conventional wireless technology. Network 108 and host 110 may be logically organized in tiers having conventional server, router, and repeater technology (not shown) for distributing the computing load of supporting numerous locators.

Locators 102, 104, and 106 may receive commands from host computer 110 and provide reports to host computer 110 via network 108. Commands may include requests by host computer 110 for the status of any locator (e.g., to locator 102 concerning itself or to locator 102 concerning another locator 106 cooperative with monitor 102), or of network 108. Commands from host 110 may dictate to monitor 102 the selection and configuration of links to be used for communication with identification devices. Further, host computer 110 may, by suitable commands, request notice of objects detected or a list of object identifications currently within communication range (e.g., within any particular zone) of any locator (or cooperating group of locators), and/or request raw data from which host computer 110 may detect objects or determine such a list. Finally, host computer 110, using suitable commands to locator 102, 104, and 106, may direct cooperation of locators for performing any of the functions discussed above. For example, a locator may assume the role of the host indefinitely or for a temporary period. Host computer 110 may be omitted when a locator performs functions of a host, for example, as discussed above.

A locator includes any circuit that communicates with one or more objects and provides results of such communication. A locator may include communication and/or computation capability. A locator may communicate at one or more levels of protocol (e.g. decoding/coding radio signals, disassembly/assembly of messages, and/or computation related to detection/interrogation methods). For example, a locator may include a system radio receiver as discussed above. In another implementation, a locator includes both a radio transmitter and radio receiver (e.g., for use with transponders). A locator may include software and/or circuits for receiving messages and responding to messages (e.g., messages to/from other locators, messages to/from identification devices, and/or messages to/from a host computer).

Results of detection of identification devices may be provided to an operator at the locator (e.g., when host computer 110 is omitted) or to a host computer for processing as discussed above. System 100 may include one or more locators, several locators being used for redundancy or when the capacity of a single locator is exceeded by physical distribution of objects or the desired extent of communication with an expected population of objects in perhaps a limited time. For example, locators 102, 104, and 106 may be functionally equivalent and arranged in several zones (e.g., geographic territories). Zones may overlap geographically when, for example, each zone uses a different communication medium, frequency, modulation, protocol, or address group. The location of an object as within a particular zone may be ascertained by communication with one or more locators 102, 104, and 106. Movement of an object from one zone to another may be determined by host computer 110 by conventional comparison techniques based on suitable reports from locators 102, 104, and 106.

A locator includes a circuit that provides, inter alia, a physical interface to the common medium (or media) used for communication with identification devices. For identification deices that communicate using radio frequencies, a locator includes one or more antennas. Locators may operate independently or may cooperate in groups of locators. Therefore, the antenna or antennas coupled to one locator may constitute an antenna system or may be part of an antenna system that includes the antennas coupled to one or more other locators. An antenna system includes any system for using one or more antennas for receiving or sending messages between a locator and one or more objects. When communication from one or more of several locators is limited to providing operative power, the receiving antenna functions for those locators and antennas may be omitted.

As shown, an antenna represents any transducer of energy used in communication including, for example, a lens for infrared light energy or a horn or structure for acoustic energy. An alternate antenna includes one or more modules (e.g., replaceable components) for reconfiguring operation from any communication medium or frequency band to another medium or frequency band. In the discussion below, an antenna pattern is exemplary of a communication pattern.

In an implementation having a locator that includes radio receiver circuits and/or transmitter circuits, a locator may include circuitry for antenna selection, antenna squelching, antenna impedance matching (i.e., tuning), received signal processing (e.g., analog detector, demodulator, preamplifier, analog-to-digital converter, and/or pulse counter or timing analyzer circuits), pre-transmit signal processing (e.g., gated oscillator, code converter, digital-to-analog converter, digital-to-pulse converter, amplifier, modulator, message header generator, sync signal generator, and message trailer generator), and error detection (e.g., CRC generator and/or checker). The locator may include a processor for accepting commands from network 108, providing control signals to the circuits described above, performing methods that cooperate with such circuits to accomplish functions described above, and providing status, data, and error messages.

Detection of an identification device so as to provide indicia of detection in host computer 110 (or in one or more locators 102, 104, and 106) may involve one or more antennas. Each link may include any number of signals in either direction between antennas and identification devices. For example, a link may represent any one or more signals of the type transmitted or received in an object identification system described in U.S. patent application Ser. No. 09/372, 274 filed Aug. 11, 1999 by James L. Rodgers et. al, incorporated herein by this reference. It is not necessary for the same antenna to operate for sending and receiving communication to a particular identification device. For example, one antenna (not shown) of locator 102 may provide a power signal to an identification device and a second antenna may receive a beacon signal provided by an identification device.

Each identification device may have one or more antennas. The orientation of an antenna of an identification device, as discussed above, includes the orientation of the identification device antenna with respect to an antenna used by a locator for communication with identification devices and includes the orientation of the identification device antenna with respect to other identification device antennas. When essentially planar antennas are used in identification devices, coupling of antennas for power transfer from a locator to an identification device may be primarily by magnetic fields. Such coupling may decrease as an identification device antenna orientation differs from coplanar (or parallel planes) with respect to a locator antenna and other nearby identification device antennas.

In general, a link as discussed above, includes a signal transmitted by a transmitter and received by a receiver (or power circuit). A link may involve either an in-range identification device or a not-in-range identification device. Whether or not the link involves an in-range identification device depends on factors including the antenna pattern of the transmitter, the antenna pattern of the receiver, the distance traveled by energy (e.g., RF) related to the signal, properties of the media through which the energy passes, and properties of the environment contributing to absorption, reflection and refraction of the energy. One or more factors may vary in time during the duration of communication via a link. An antenna pattern is a spacial (e.g., 2- or 3-dimensional) representation of performance of an antenna (or array of antennas). An antenna pattern for a transmitting antenna describes radiated field strength as measured (or predicted) at various points. An antenna pattern for a receiving antenna may describe a minimum field strength at various points that will provide in the antenna a prescribed electrical signal.

Communication via a link may include several such signals of various durations overlapping or separated in time. When detection of an identification device involves several signals (e.g., power, ringing, reply, interrogation, further reply, etc.), for example, due to system architecture, protocol, and reliability criteria, each signal individually and each combination of one or more such signals contributes to whether the identification device is in-range or not-in-range.

A zone is defined to be the volume within the periphery of a communication pattern. The multidimensional definition of in-range discussed above may be modeled as a communication pattern (e.g., corresponding perhaps more closely to a less reliable signal of a multiple signal link). A periphery of a communication pattern corresponds to the locus of points defining the boundary between in-range and not-in-range. Generally, this locus includes at least one surface in three dimensional space. In FIG. 1, for example, arc 121 represents points in a plane that are part of the intersection of the plane of the figure and such a surface. In-range and not-in-range for a particular link (e.g., a particular zone) may be defined at a system level in terms of reliability of communication using that link.

For example, zone-based communication using the system of FIGS. 1–4 and 6–8 includes two zones 120 and 130. At the center of each zone is an operating location 101 and 103 where a locator may be operated. Objects 162, 164, 166, 168, and 199 represent a randomly arranged inventory of objects, each having an attached identification device.

When an identification device is within the zone associated with a predetermined operating location, a locator operating at that operating location may establish reliable communication with the identification device. Objects 162, 164 and 166, being within the radius 124 of zone 120 are within a distance for reliable communication with a locator 102 operating at point 101. Objects 166, 168, and 199, being within the radius 134 of zone 130 are within a distance for reliable communication with a locator 104 operating at point 103. For purposes of discussion, zone-based communication is used to locate identification device 199 whose location is unknown due to an error in materials handling.

Identification devices 171 through 175 have been placed according to various aspects of the present invention for defining zone 120. Identification devices 181 through 191 have been placed according to various aspects of the present invention for defining zone 130. These identification devices 171 through 191 are stationary and serve to identify directions and distances from various operating locations. In the description below, these identification devices may be referred to as markers, for clarity of presentation. Markers 171 through 174 have been placed at a radial distance 123 from operating location 101 corresponding to an omnidirectional communication pattern having a periphery 121 at the distance 123. Markers 181 through 191 have been placed at a radial distance 133 from operating location 103 corresponding to an omnidirectional communication pattern having a periphery 131 at the distance 133.

Communication between a locator and an identification device is deemed reliable when a signal bearing indicia of identification is transmitted by the identification device and received by the locator in a manner that is repeatable with a suitable accuracy. A facility having physical obstructions may cause shadows, reflections, and other disturbances affecting reliability of communication. FIG. 1 shows only a portion of a facility. These effects have been omitted from FIG. 1 for clarity of presentation; though, allowances for these features would ordinarily be made when determining zone peripheries as discussed below.

Communication with markers for a zone provides a basis for determining the reliability of future communication with identification devices expected to be within the zone. Depending on the nature of communication used, reliability may be a function of transmitted signal energy, receiving sensitivity, expected signal properties, and communication patterns for transmitting and receiving. For example, when communication with all markers of a zone can be established with a prescribed reliability (e.g., all markers respond accurately in any 6 out of 10 attempts, i.e., 60%) all identification devices that respond with the prescribed reliability may be understood to lie on or within the periphery 121 or 131 defined by the markers. When a target reliability is established as the prescribed reliability plus a guard band (e.g., 5%), all identification devices that respond with the target reliability may be understood to lie within the periphery 122 or 132 of the zone. The periphery 122 (or 132) of the zone 120 (or 130) may be marked on the facility for convenience of placing markers just outside the periphery 122 (e.g., at a radial distance 123 greater than the radial distance 124) and for assuring the objects to be tracked are inside the periphery of at least one zone.

In operation, a zone-based communication system facilitates the location of a desired identification device by assuring that a locator is being operated at a known location; and, by directing movement of a portable locator toward the zone and portion of a zone where the desired identification device may be found. For example, consider that locators 102 and 104 were operated at fixed locations 101 and 103 and network communication between them provides a consolidated report showing inventory by zone. Identification devices 162, 164, 166 are reported to be within zone 120 and identification devices 166, 168, and 199 are reported to be within zone 130. By reviewing the entire inventory for desired device 199, an operator would be directed to search for device 199 in zone 130, for example, beginning at operating location 103 with a portable locator 106. By following directions given on a display of the portable locator, the operator is subsequently directed (as discussed in detail below) to operation location 105 and to use a communication pattern 135 having a smaller size (e.g., radius 136 less than radius 134). In a repetitive manner, the operator moves as directed to operating location 107 and to use smaller communication pattern 140 having radial distance 143 and periphery 142. Identification device 199 is then found by visual search of a limited volume (e.g., up to a distance 143 of pattern 140).

Communication according to various aspects of the present invention may be described with reference to a communication pattern defined in accordance with a prescribed reliability as discussed above. A communication pattern may be related to one or the combination of several properties of the transmitter, transmitter antenna, transmitted signal, receiver, receiver antenna, received power signal (for passive identification device), or received signal. Communication patterns may be either omnidirectional or directional. A locator may communicate using one or more communication patterns selected from a group of omnidirectional and directional patterns.

A set of communication patterns may be provided in a locator by selection of a set of antennas, as discussed in the aforementioned patent application Ser. No. 09/372,274. A set of communication patterns may be expanded (or provided from one antenna) by including between the selected antenna and the remaining communication circuits an attenuator that provides a set of attenuations, each attenuation when used with a selected antenna, accomplishes a different communication pattern. An attenuator may be placed in a transmitting circuit to reduce transmitted signal power and/or placed in a receiving circuit so that received signals having power less than a minimum will not result in detection of an identification device. Any conventional circuit providing programmable attenuation (e.g., programmable matching or loading) may be used. For example, circuits having reactive or resistive components in arrangements of the type described in U.S. Pat. No. 4,486,722 to Landt, issued Dec. 4, 1984; or U.S. Pat. No. 4,201,960 to Skutta, issued May 6, 1980. A plurality of communication patterns may also be obtained by using a circuit having programmable gain. In a transmitter, a programmable gain may provide programmable output transmitted power. In a receiver, programmable gain may provide programmable input sensitivity. Both programmable attenuation and programmable gain may be used in the same or different links for communication according to various aspects of the present invention. In a preferred implementation, programmable gain circuits are not used and a programmable attenuator is used in the receiver circuit of a locator.

Figure 2:
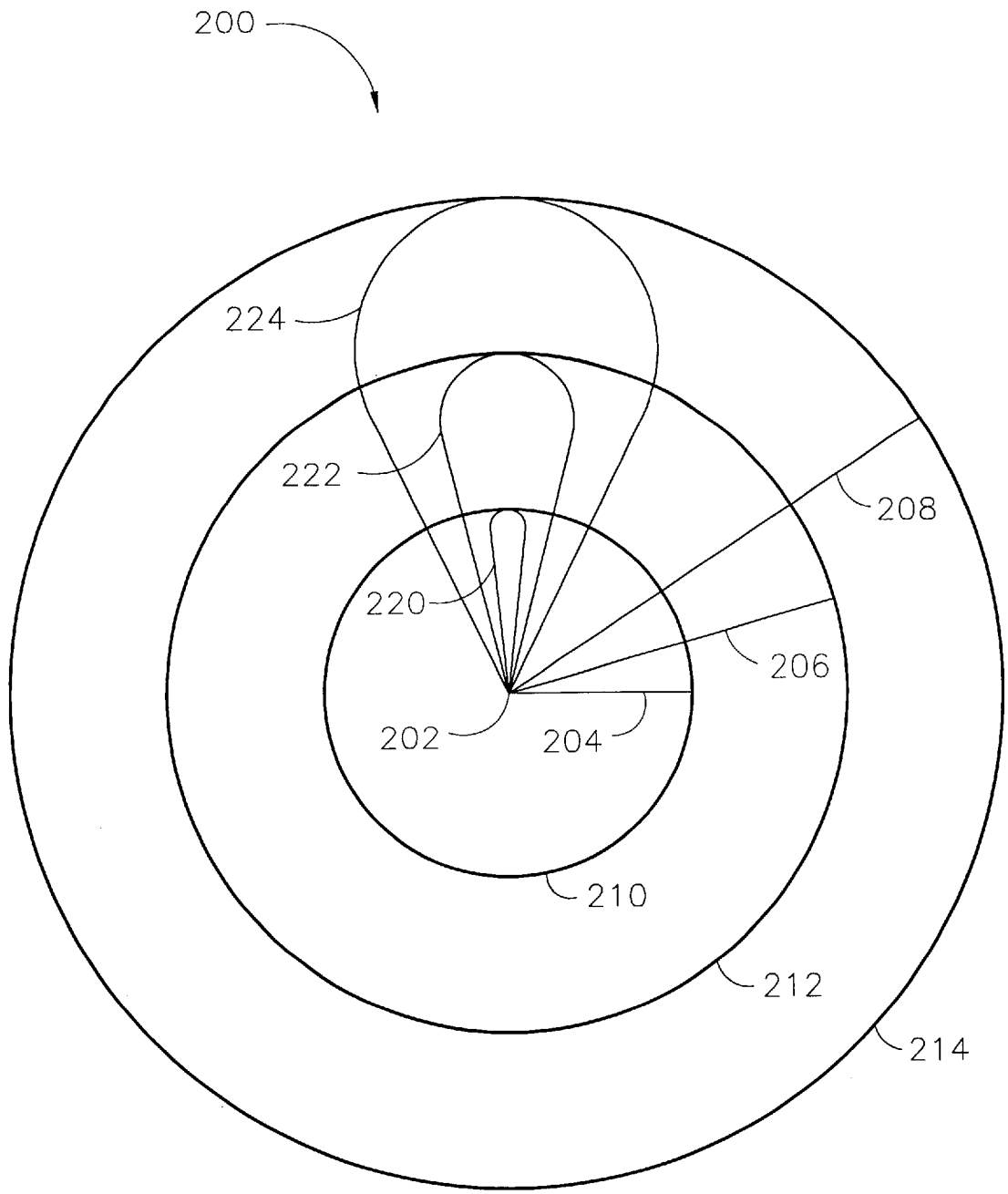
FIG. 2 is a diagram of communication patterns of a locator of the system of FIG. 1.
Figure 3:
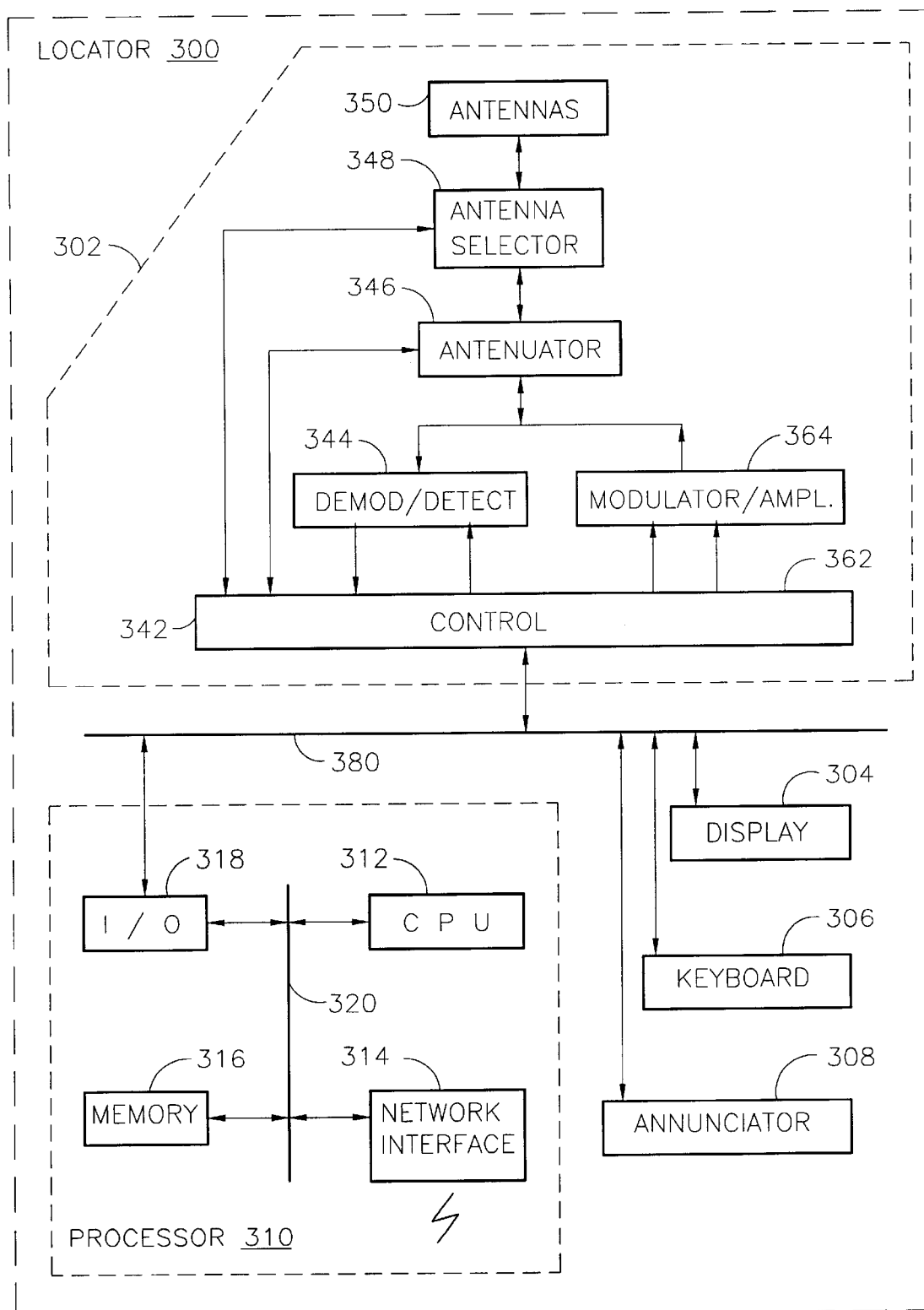
FIG. 3 is a functional block diagram of a locator for use at operating locations of FIG. 1.
Figure 4:
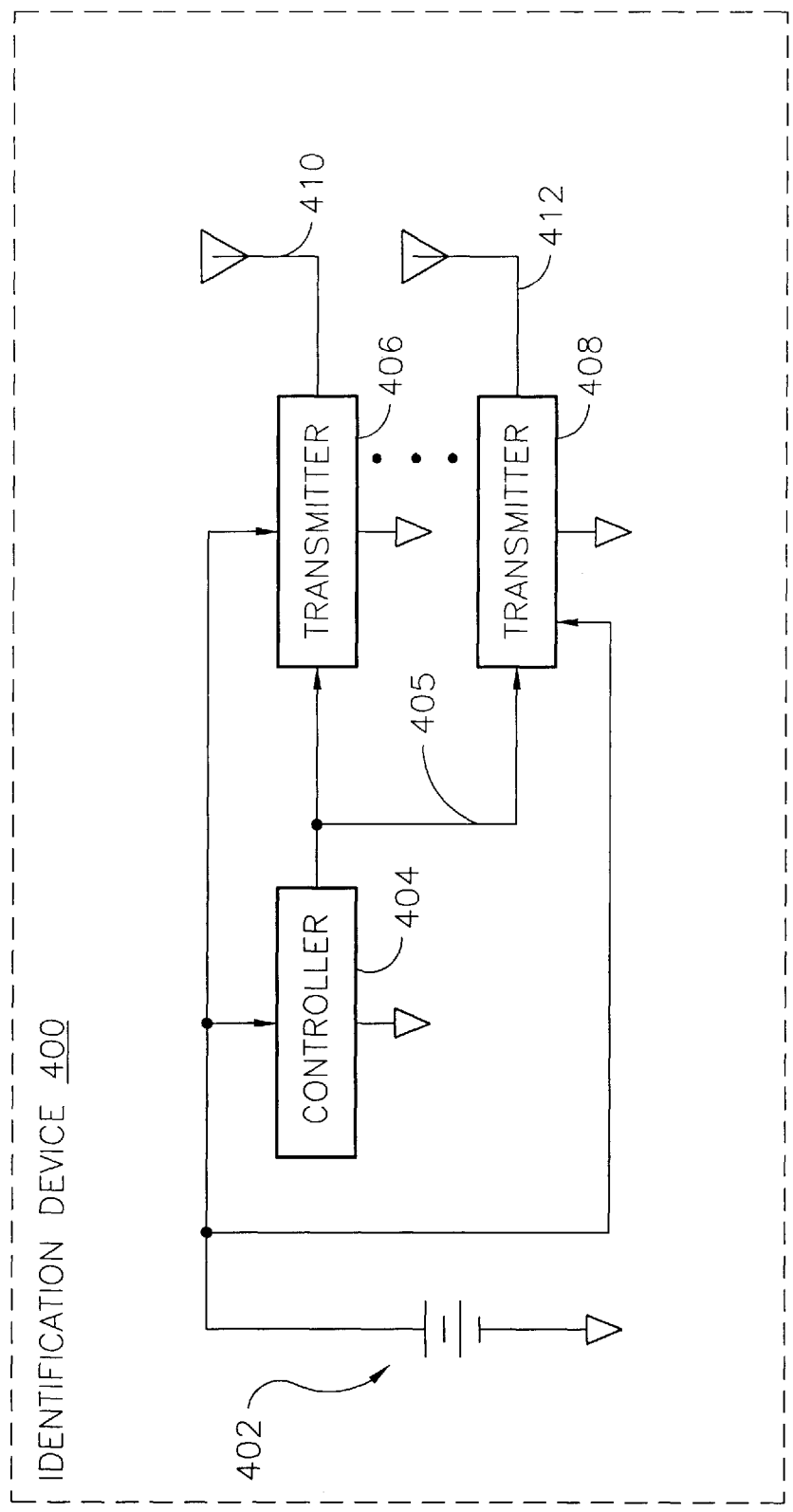
FIG. 4 is a functional block diagram of a radio frequency identification (RFID) device for use in the system of FIG. 1.

For example, the set of communication patterns 200 of FIG. 2 is referred to an origin 202 corresponding to an operating location of a locator. Omnidirectional patterns 210, 212, and 214 are shown in the plane of FIG. 2 as circular patterns with radius 204, 206, and 208 respectively. Directional patterns 220, 222, and 224 have a maximum distance from operating location 202 corresponding generally to radii 204, 206, and 208. An operator of a portable locator that provides communication via any of the set of communication patterns 200, may switch from an omnidirectional pattern (e.g., 212) to a directional pattern (e.g., 222) and then point the locator in various directions (e.g., perform a slow 360 degree sweep) to acquire a group of responses from identification devices that are within the pattern at each of several orientations.

A locator, according to various aspects of the present invention, may be of the type described in the aforementioned patent application Ser. No. 09/372,274 (therein called a monitor with antenna system) expanded to perform the additional functions described herein. A locator may be implemented for portable use (e.g., hand-held, battery powered operation). For example, locator 300, of FIG. 3, includes a processor 310, a display 304, a keypad 306, an annunciator 308, and a transceiver 302 all coupled for data communication via bus 380. Locator 300 may include any conventional mix of analog and digital circuitry, including circuitry of the type described in the aforementioned patent application Ser. No. 09/372,274 for a host, a locator, and an antenna node. Firmware and software used in locator 300 may be developed using conventional software development techniques. Packaging of a locator 300 may include packaging as circuit boards, integrated circuits, and/or hybrids as desired for any of the applications discussed above. Host computer and network functions for cooperation of locators as discussed above and in aforementioned patent application Ser. No. 09/372,274 may be implemented within each locator. A locator operated from a stationary position (e.g., as a desk top unit) may perform the functions of a conventional monitor or interrogator in addition to functions described herein.

Processor 310 includes central processing unit 312, memory 316, input/output circuit 318, and network interface 314, all coupled to bus 320 for data communication. Processor 310 may include a conventional microprocessor programmed (initially or by file transfer) to perform methods to accomplish functions described above and the methods described with reference to FIGS. 6–8. Network interface 314 receives information from network 108 to be stored in memory 316 (e.g., commands, messages, programs, processor and transceiver configuration and operation data, tables, and parameters for particular functions including identification of an identification device to be located) and provides onto network 108 information from memory 316 (e.g., responses to commands, messages, status, reports, and results of particular functions and operator inputs).

Display 304 includes any conventional information display driven by processor 310 either via I/O circuit 318 and bus 380 or directly when display 304 is coupled to bus 314. Display 304 shows control menus, status reports, identification device detection and identification reports, and operator guidance (as discussed below). For a reduced capability locator, display 304 may be omitted and guidance provided by annunciator 308.

Keyboard 306 includes any conventional data entry or data selection device (e.g., mouse or track ball). Keyboard 306 and display 304 cooperate to provide a conventional user interface (e.g., a graphical user interface).

Annunciator 308 may include light or sound emanating device(s) to alert the operator of conditions that may arise during any system functions. For example, lights or sounds may be binary (e.g., on, off, flashing, beeping) or proportional (e.g., brightness, volume, repetition rate, or pitch) to indicate whether the locator is at or near an expected operating location and/or the reliability of communication with a desired identification device.

Transceiver 302 includes control circuit 342, receiver circuit 344, transmitter circuit 364, attenuator 346, antenna selector 348, and antennas 350. Control circuit 342 (which may include a microcomputer circuit or state machine) provides signals to transmitter circuit 364 to direct what is to be transmitted, the manner of transmitting, and when transmitting is to occur. Control circuit 342 provides signals to receiver circuit 344 to direct detection of signals (e.g., thresholds and timing), demodulation (e.g., specified carrier or synchronous detection frequency), and other conventional receiver functions including digital signal processing, analog to digital conversion, sampling, averaging, and noise floor measurements. Control circuit 342 accepts signals from receiver 344 that include messages to be parsed (e.g., packets), whether or not a desired signal was received, and status. Control circuit 342 provides commands to and receives status from attenuator circuit 346 to accomplish variation of communication patterns for receiving and transmitting. Control circuit 342 provides commands to and receives status from antenna selector 348 to determine one or more antennas to be coupled for receiving, one or more antennas to be coupled for transmitting, and one or more antennas that should be squelched. When a suitable set of communication patterns may be accomplished using several antennas, attenuator 346 may be omitted. In addition, the timing of antenna squelching and selection is determined by control circuit 342. When a suitable set of communication patterns may be accomplished using one antenna, antenna selector 348 may be omitted.

Transmitter circuit 364 accepts direction for transmitting messages from controller 342 and performs, in any conventional manner (e.g., according to one or more transmitting protocols), message data formatting, modulation, and amplification. Resulting signals are coupled to antennas 350 through one or more of attenuator 346 and antenna selector 348.

Receiver circuit 344 accepts direction (for receiving messages) from controller 342 and performs, in any conventional manner (e.g., according to one or more receiving protocols), signal measurement and analysis, demodulation, detection, comparison to thresholds, message receiving, and error detection. Receiver circuit 344 may provide message data to controller 344 in any suitable format to facilitate controller 342 providing message data and/or results of comparison to processor 310. A determination that any (or a particular) identification device is within the communication pattern presently in use for reception may be made by receiver circuit 344, control 342, or CPU 312 as desired. When numerous attempts are made to establish a link, as discussed above, CPU 312 may make the final determination based on reports (or the absence of a timely report) provided by receiver circuit 344 and/or control circuit 342.

Controller 342 may cooperate with receiver circuit 344 and/or transmitter circuit 364 to effect closed loop control for the purpose of maintaining a link as conditions affecting the link change over time. The link to be maintained may involve a locator and one identification device or marker. The basis for closed loop control (i.e., the basis of the loop error signal) may involve a marker, particular markers and/or identification devices, all markers of a zone, or a desired identification device and markers of a zone. For example, as a locator is moved about a facility, received signal power (or amplitude), noise components and power (or amplitude), and the resulting signal to noise ratio may vary as a result of, inter alia, proximity to noise sources, alignment with energy absorbing and reflecting surfaces of the facility, changes in orientation of identification devices (e.g., markers) and/or locators, etc. When CPU 312 and/or controller 342 determines that a reliability of communication has degraded, link reliability may be improved by directing controller 342 to take one or more of the following actions: (a) direct selection of additional or alternate antennas (via antenna selector 348), and (b) adjust attenuation or gain (via circuits described above with reference to attenuator 346, receiver 344 and transmitter 364). Actions may be taken as a consequence of comparing one or more measured values (e.g., received signal amplitude, received noise amplitude, or ratio of detections to attempts) to respective limits; and if beyond the limit, imposing a hysteresis effect (e.g., by setting a timer to avoid further action until lapse of the timer, or temporarily making the limit less likely to be exceeded).

Antennas 350, antenna selector 348, and attenuator 346 cooperate to provide a set of communication patterns. A desired communication pattern is effected by control 342 and/or processor 310. Attenuator generally represents an impedance matching circuit that matches (or mismatches in steps or proportionally) (a) receiver circuit 344 to an operative antenna; and/or (b) an operative antenna to transmitter circuit 364. Impedance matching/mismatching may be accomplished by any combination of resistive and reactive elements. Antenna selection may be accomplished using semiconductor switches, relays, or combinations thereof. Antennas may be omnidirectional, directional, individual or in array formation.

An identification device, for use in a system of the present invention, may include any device of the types described in the aforementioned patent application Ser. No. 09/372,274. For example, identification device 400, of FIG. 4, includes a battery 402, a controller 404, one or more transmitters 406–408, and a respective antenna 410–412 coupled to the transmitters 406–408. Circuitry, software, and construction of device 400 may be of any conventional type. Device 400 may include any conventional mix of analog and digital circuitry, including circuitry of the type described in the aforementioned patent application Ser. No. 09/372,274 for a transceiver or transponder. Firmware and software used in device 400 may be developed using conventional software development techniques. Packaging of circuits and the assembly of device 400 may include techniques conventionally used with integrated circuits, hybrids, smart cards, labels, tags, badges, packing materials, packaging, receptacles, containers, or signage as desired for any of the applications discussed above.

For example, identification device 400 may operate as a radio frequency beacon type RFID tag. Battery 402 provides power to controller 404 and transmitters 406–408. Controller 404 suitably directs via line 405 the manner of transmitting (e.g., message format, signal properties, modulation, timing of transmission) and what is to be transmitted (e.g., message content, number of messages, timing of retransmissions).

A method, according to various aspects of the present invention, prepares a facility for zone-based communication. Zone-based communication for object identification and location may use one or more zones and use locators in fixed and/or portable configurations. Zones are defined with reference to the reliability of suitable communication patterns that are provided by suitable locators operating at suitable operating locations in the facility. What constitutes a suitable number and arrangement of zones as well as suitable patterns, locators, and locations is subject to the judgement and preferences of the user and the cost/performance goals of the particular application.

Figure 5:
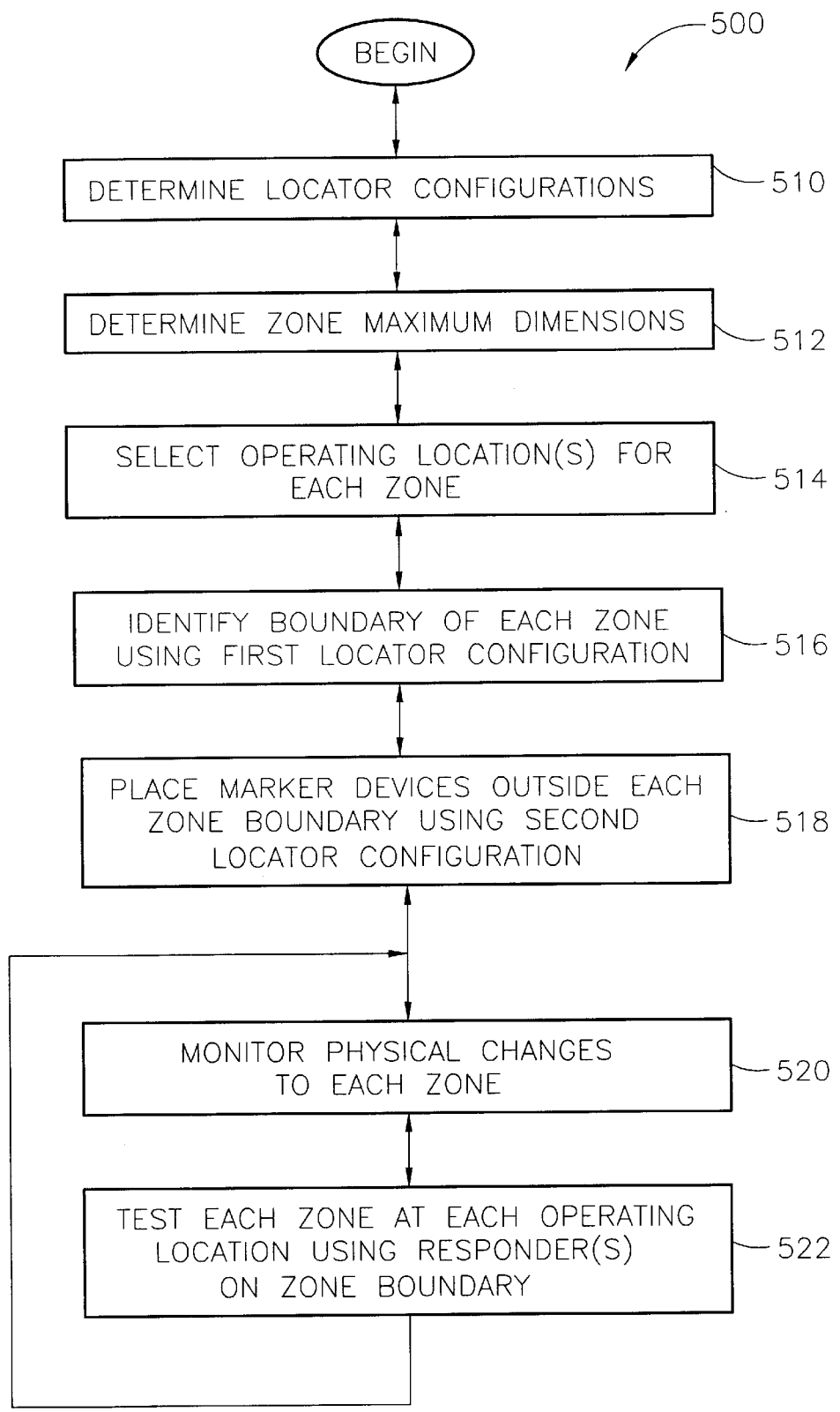
FIG. 5 is a flow chart of a method for preparing for zone-based communication according to various aspects of the present invention.
Figure 6:
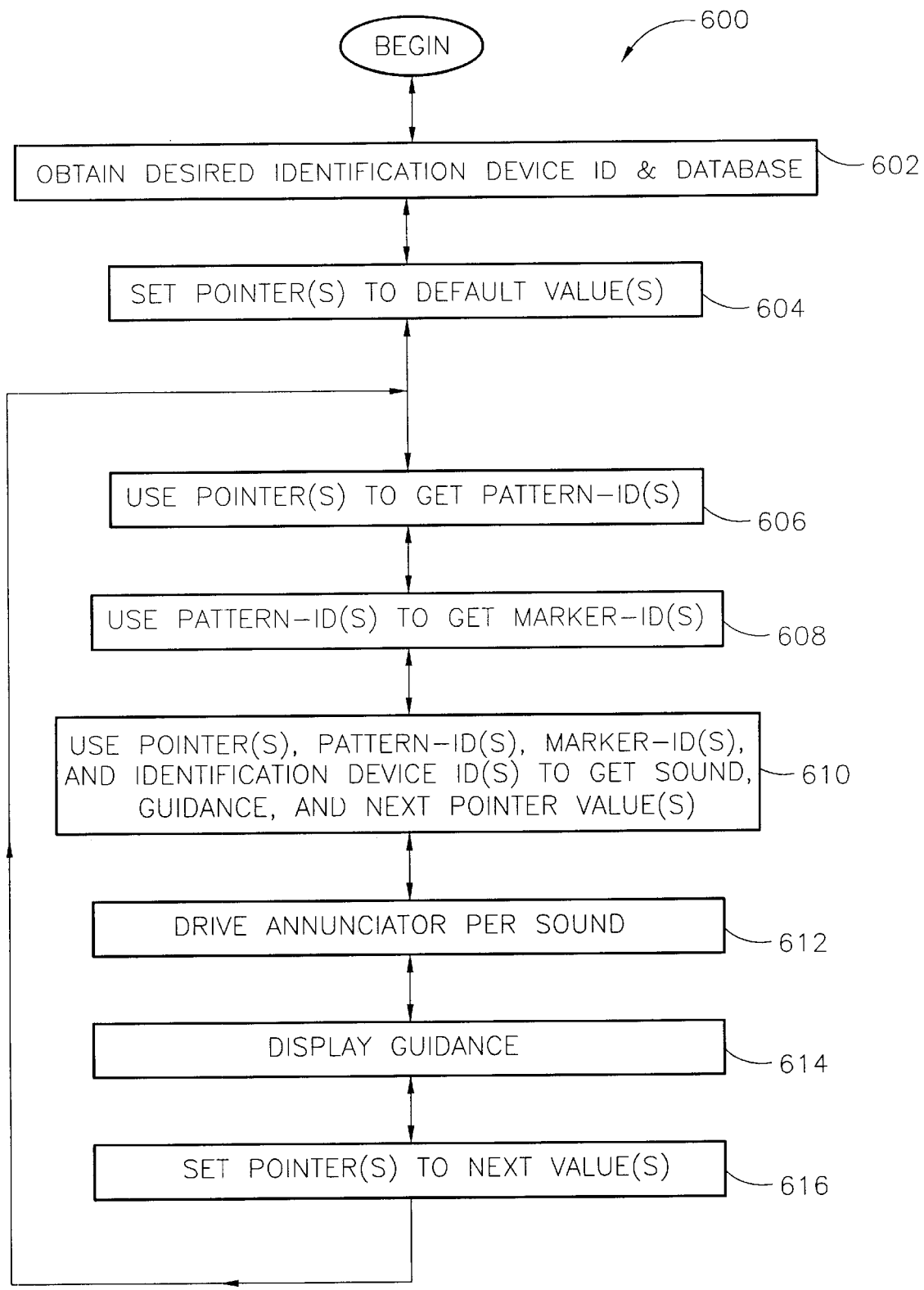
FIG. 6 is a flow chart of a method for assisting location of an identification device using a portable locator of the system of FIG. 1.

For example, method 500 of FIG. 5 prepares a facility (e.g., a facility represented in part by the functional arrangement of zones in FIG. 1) for zone-based communication using the system discussed above with reference to FIGS. 1 through 4. The following steps may be performed in any order or in a time overlapping order as desired.

By reliance on specifications, analysis, or test, the locator configurations giving rise to a suitable set of communication patterns are determined (step 510). These configurations may include multiple attenuations and/or multiple antennas, as discussed above. To facilitate location of a desired identification device in any part of the facility from one operating location, it may be desirable to include in the set of communication patterns, a pattern that is large enough to include the entire facility.

Specifications, analysis, or test of a combination locator and identification device may be used to determine the maximum dimensions of a zone (step 512). A zone maximum dimension depends also on a selected parametric definition of reliability of communication at the boundary of the zone. For example, reliability may be expressed as a number of error free messages transferred across the link in a number of attempts (e.g., any 6 out of 10) or by a number of consecutive successes out of a total number of attempts (e.g., 4 in a row out of 10). Message length may correspond to messages used in system operation or shorter or longer length messages as desired. The amount of time expected to be taken to determine whether a given device is in or out of range may be limited by other system performance goals.

Steps 510 and 512 should provide (or may be repeated until) a set of communication patterns includes a first pattern that closely includes the entire zone and a second pattern that includes the first pattern and is larger in all directions than the first pattern. The first and second patterns may each be omnidirectional; or, directional with an antenna sweep capability to simulate an omnidirectional pattern.

One or more operating locations for each zone are selected (step 514) to eliminate any cut-off regions where an identification device, if located therein, would not be detected by a locator operated at any of the defined operating locations. When line of sight communication is preferred for communication reliability, every point within the zone should be on a line of sight to at least one operating location.

The physical location of the boundary of each zone is located in the facility (step 516) by testing a link that extends from a designated operating location (designated in step 514) to the boundary and operates between an identification device and a locator using the first pattern (see step 512). The boundary may be conveniently determined by placing an identification device (i.e., a target) having (or moved so as to have) an omnidirectional communication pattern at the operating location and moving about the expected outer edge of the zone with a portable locator directed to just detect the target. The phrase "just detect" means that the communication link exhibits the reliability expected at the boundary of the zone within a tolerance less than the difference in range between the first pattern and the second pattern.

A number of markers are placed (step 518) outside the boundary determined in step 516. By empirical measurement, analysis, or test, each marker is to be placed to be reported by a locator as validly present when the locator is operating from the designated operating location using the second pattern; and, is to not be reported by the locator as validly present when the locator is operating from the designated operating location using the first pattern. The phrase "validly present" means that the corresponding link has no less than the reliability expected at the boundary of the zone within a tolerance less than the difference in range between the first pattern and the second pattern. Unexpected link performance may require repositioning the operating location, revising the physical location of the zone boundary, or repeating the method from step 510 with a different set of communication patterns.

Although the facility is prepared for zone-based communication at the completion of step 518, physical changes in and to the facility that could affect communication pattern dimensions should be monitored (step 520). Periodically, the performance of markers and locator configurations should also be tested (step 522), for example, by testing each zone at each operating location using one or more target identification devices intentionally placed on the boundary of the zone. Steps 520 and 522 may be repeated at any suitable interval, for example, monthly, for a facility having frequent movement of large articles.

An operator may locate a desired identification device in a facility that has been prepared for zone-based communication, for example, by method 500 of FIG. 5, by moving about the facility with a portable locator. The locator may assist the operator by performing a method according to various aspects of the present invention. Such a method includes using a database to obtain: (a) identification of one or more communication patterns; and (b) information for determining a next query of the database, the determination based in part on the identification of markers that are validly within one or more of the communication patterns.

The database may also provide: (a) indicia for driving an audio annunciator; and (b) information to be displayed to the operator to direct movement of the operator. For example, method 600 of FIG. 6 may be stored in memory 316 of locator 300 and performed by CPU 312 to assist an operator in locating a desired identification device, the method including the following steps.

To locate a desired identification device, the portable locator must gain access to the identity (ID) of the desired identification device and to a database (step 602). Access to a suitable identification device ID may be provided (a) when the operator enters an ID (or specification from which an ID may be derived) on keyboard 306; (b) when the operator indicates on keyboard 306 a selected ID based on a selection list displayed on display 304; or (c) as provided by host computer 110, locator 102, or locator 104 via network 108 linked to network interface 314, as discussed above.

A database as used by a portable locator may be small enough and organized in a manner for storage and use from memory 316. In systems having many zones, many markers, or for ease of maintaining system integrity, a database may be stored in a memory other than the memory of the portable locator. Memory in locator 102, locator 104, and/or host 110 may provide storage for a database. Software that performs database functions (e.g., query, append, delete, etc.) may be performed by any computer coupled to network 108 using conventional distributed processing technology.

A database may be organized in any conventional manner including, for example, an array of record structures, a linked list (or graph) of record structures, multiple arrays having different index keys, and multiple files of records in cooperation with index files. The functions related to data provided in response to a query may be implemented as providing operations in response to a query. In the latter case, the database may include macros, procedures, code, or pointers thereto that as a whole perform one or more steps of method 600. Contents of the database may be determined from knowledge of marker placement and overlaying maps of the facility and patterns scaled to match the scale of the maps. Any sequence of patterns may be used to implement logical guidance. The logic of the guidance may implement any conventional search, including a spiral search or a fan shaped search. Ambiguity may be resolved by a trial and error guidance, returning to known operating locations, and/or returning to particular (e.g., 105) locations (retracing operator movements).

In a preferred implementation, the table transferred to a locator may include information describing: (a) a first zone in which the locator is expected to be currently located and (b) a second zone adjacent to the first zone in the direction toward the expected location of the desired identification device to be located. Such a description may include all markers associated with the respective zone. When CPU 312 determines that the locator is within the second zone, the description of the second zone is referenced as the first zone and information describing a new second zone is requested and obtained from host computer 110.

After access to the database is provided, CPU 312 sets pointers to default values (step 604). Default values may correspond to the initial conditions for beginning any search for any identification device. In an alternate implementation, default values may be determined in part based on the desired ID. For example, a starting zone may be determined by the present location of the portable locator; and, a starting communication pattern, modulation, and/or message may be determined by the desired ID. Pointer values may be record numbers and/or key values used in a conventional query.

Current (initially default) pointer values are used to identify what particular communication pattern should be used by the portable locator for its next attempted communication (step 606). For example, when the database includes a record identified by the pointer, contents of the record may include an identification of a pattern (pattern-id). More than one pattern may be identified and the results from use of more than one pattern may be combined. Communication using a pattern may impliedly use several related patterns. For example, by identifying pattern 212 (of FIG. 2), patterns 210 and/or 214 may be used for any suitable purpose including: determining the level of noise presently in the environment; determining suitable transmit power level, receiver sensitivity, communication signal frequency, number of retries, modulation, and/or message structure (e.g., shorter messages for high noise environments).

The portable locator then transmits and receives energy using the identified communication pattern(s) to obtain indicia of identification of one or more markers (e.g., one or more marker-ids) (step 608). Indicia of the current location of the operator and portable locator may be determined from marker-ids and displayed for verification to the operator via display 304 and keyboard 306. It is not necessary for the location of the locator to be displayed.

The results of communication using the identified pattern (s), that is marker-id(s) and identification device-id(s), may be used in combination with current pointer values and pattern-ids to obtain from the database (step 610): indicia for operating annunciator 308 and display 304, as well as pointer values to be used in a next iteration of the main loop of method 600.

Annunciator 308 may then be actuated in accordance with the indicia to emit a sound (step 612). The sound may indicate: (a) whether or not the desired identification device has responded reliably (e.g., is within pattern 220) at a closest distance (e.g., 204) and minimal regional area of ambiguity (e.g., area of pattern 220) capable of being resolved by the portable locator; (b) any lesser indication of proximity, resolution, or reliability of communication between the locator and the desired identification device (e.g., different tones for different proximities, pattern sizes, and/or reliabilities); and or (c) audible recitation (synthesized voice using spoken English) explaining information displayed on display 304.

The display may show text and/or symbols (generally called guidance herein) that direct movement of the operator (step 614). Directed movement may include, for example: (a) begin visual search because the identification device is within a pattern having the smallest size and highest reliability; (b) move a prescribed distance (e.g., the difference between pattern sizes, such as distance 208 minus distance 206) in a prescribed direction (e.g., absolute compass point (East, NE, etc.) or relative to last movement (continue going straight ahead, bear right, etc.)); (c) obtain a facility map and proceed to a prescribed grid location; or (d) retrace movements to resume search from a known prior location.

Pointer values obtained from the database (step 616) may then be used in a next iteration of the loop (e.g., steps 606 through 616). If pointer values match a predetermined value, no further iterations of the loop may be desirable and the assisted search for the desired identification device may be considered complete to the extent that a portable locator can assist in the search. For example, if portable locator 106 of FIG. 1 is used to locate identification device 199, operation at position 105 and omnidirectional pattern 135 may be sufficient to establish that both the portable locator and the desired identification device are probably in zone 130. This conclusion may be based on reliable recognition of markers 181–191 when portable locator 106 was last operated at location 103 using omnidirectional patterns 131 and 132 and other logic and indications. Movement from location 103 to location 105 and use of a smaller size pattern (e.g., distance 136 is less than distance 134) may have been indicated by guidance and/or sound provided by portable locator 106. Other logic and indications may include reliable recognition of a subset of markers (e.g., 187–189) and recognition of the desired identification device 199. At location 105, use of directional patterns may be made in accordance with pointer values discussed above. For example, use of pattern 224 and/or 222 and guidance to the effect of "proceed in the direction at which the most rapid beeping sound occurs" from annunciator 308 may be sufficient for the operator to move generally toward location 107. At location 107, portable locator 106 may recognize markers 187–188 and device 199 and the assisted search may be completed. By assisting the search, a desired identification device that could have been located anywhere within zone 130 was determined to be located within pattern 142, dramatically reducing the scope of a visual, labor intensive search.

Operating locations may be identified by grid location in the facility for convenience of communication pattern range analysis and human factors during an assisted search (e.g., guidance using grid locations). If the operating locations are obvious to the operator (e.g., marked on the floor of the facility) then moving from one location to another may be accomplished without further guidance from the portable locator. Without visual queues as to the physical location of an operating location, a portable locator may offer the operator guidance in response to detecting markers placed in the facility to locate a desired operating location. For example, instead of providing access to a desired identification device ID, access may be provided in method 600 to a desired operating location. The remaining method may be performed with the goal being exclusive recognition with a particular pattern of only (and all) markers for the desired zone. Database contents for this alternate search may be determined in any manner, for example, proceeding in a sequence of patterns of smaller sizes beginning with an omnidirectional pattern of large size; or triangulation using directional patterns and estimates of distance based on comparisons of communication reliability using two or more related patterns, as discussed above.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A locator comprising:
   a. a receiver that provides a plurality of signals each signal having respective indicia of identification device presence within a respective communication pattern; and
   b. a processor that performs a method for determining whether a first identification device is located within a zone, the method comprising:
      determining, in response to signals of the plurality, a respective reliability of communication between the receiver and a plurality of identification devices, the plurality comprising the first identification device and at least one second identification device, wherein:
         (1) a first and a second communication pattern each respectively has a periphery such that communication with a provided identification device when located beyond the periphery is less reliable than communication with the provided identification device when located within the periphery;
         (2) the first identification device is located within the periphery of the first pattern;
         (3) each second identification device is located beyond the periphery of the first pattern and within the periphery of the second pattern; and
         (4) the first pattern has a periphery substantially within the zone;
      comparing each respective reliability of communication to a respective threshold to identify validly present identification devices;
      determining that the first identification device is within the zone in accordance with whether the first identification device is validly present within the first pattern, the second identification device is validly present within the second pattern, and the second identification device is not validly present within the first pattern.

2. The locator of claim 1 wherein the receiver provides each signal in response to received radio frequency energy.

3. The locator of claim 1 wherein each pattern corresponds at least in part to a respective sensitivity of the receiver.

4. The locator of claim 3 wherein:
   a. the receiver comprises an attenuator operative in accordance with an attenuation of a plurality of attenuations; and
   b. the receiver sensitivity is responsive to the operative attenuation of the attenuator.

5. The locator of claim 1 wherein:
   a. the locator further comprises a transmitter for communication with identification devices; and
   b. each signal is responsive to transmission by the transmitter.

6. The locator of claim 5 wherein each pattern corresponds at least in part to a respective radiated power of the transmitter.

7. The locator of claim 5 wherein the receiver provides the plurality of signals in response to receiving within a first range of frequency and the transmitter operates within a second range of frequency different from the first range.

8. The locator of claim 1 wherein to be validly present, reliability of communication is based on one signal having indicia of a respective identification device.

9. The locator of claim 1 wherein comparisons with respect to a particular pattern are made with reference to a particular threshold.

10. The locator of claim 1 wherein the receiver has a respective configuration for operating in accordance with each pattern.

11. The locator of claim 10 wherein the processor is coupled to the receiver for identifying at least one configuration for receiver operation.

12. The locator of claim 11 wherein the method further comprises:
   a. identifying to the receiver a configuration for receiver operation in accordance with the first pattern; and
   b. identifying to the receiver a configuration for receiver operation in accordance with the second pattern.

13. The locator of claim 12 wherein the processor comprises a memory that stores indicia of a multiplicity of associations, each association making reference to a particular configuration and a particular zone of a plurality of zones.

14. The locator of claim 13 wherein:
   a. the receiver comprises an attenuator that attenuates energy received and provides an attenuator output signal, each signal provided by the receiver being responsive to the attenuator output signal, attenuation of the attenuator being responsive to the processor in accordance with an identified configuration; and
   b. the step of identifying to the receiver a configuration for receiver operation in accordance with the second pattern is performed in accordance with a maximum attenuation with which the second identification device is determined to be validly present.

15. The locator of claim 14 wherein the step of identifying to the receiver a configuration for receiver operation in accordance with the first pattern is performed in accordance with the maximum attenuation.

16. The locator of claim 14 wherein the step of identifying to the receiver a configuration for receiver operation in accordance with the first pattern is performed in accordance with the maximum attenuation and an offset.

17. The locator of claim 1 wherein:
   a. each signal further provides indicia of identification device identification; and
   b. the processor further comprises a memory that stores indicia of a multiplicity of associations, each association making reference to a particular identification device identification and a particular zone of a plurality of zones.

18. A method for determining whether a first identification device is located within a zone, the method comprising:
   operating a portable locator within the zone to determine a respective reliability of communication between the locator and a plurality of identification devices, the plurality comprising the first identification device and at least one second identification device, wherein:
      a. the first identification device is located within a periphery of a first communication pattern;
      b. each second identification device is located beyond the periphery of the first communication pattern and within the periphery of a second communication pattern;
      c. the first and the second communication pattern each respectively has a periphery such that communication with a provided identification device that is physically located beyond the periphery is less reliable than communication with a provided identification device that is physically located within the periphery; and
      d. the first communication pattern has a periphery substantially within the zone;

comparing reliability of communication with the second identification device via the first communication pattern and reliability of communication with the second identification device via the second communication pattern to provide a result of comparison; and indicating, in response to the result of comparison, that operation via the first communication pattern is within the zone.

19. A locator comprising:

a. a receiver that provides a signal having indicia of identification device presence within a communication pattern; and b. a processor that performs a method for determining whether operation of a portable locator is within a zone, the method comprising:

comparing reliability of communication with an identification device via a first communication pattern and reliability of communication with the identification device via a second communication pattern to provide a result of comparison; and indicating, in response to the result of comparison, that operation via the first pattern is within the zone, wherein:

(a) the first and the second communication pattern each respectively has a periphery such that communication with a provided identification device that is physically located beyond the periphery is less reliable than communication with a provided identification device that is physically located within the periphery;

(b) the first communication pattern has a periphery substantially within the zone; and (c) the identification device is located beyond the periphery of the first pattern and within the periphery of the second pattern.

20. A method for determining whether operation of a portable locator is within a zone, the method comprising:

comparing reliability of communication with an identification device via a first communication pattern and reliability of communication with the identification device via a second communication pattern to provide a result of comparison; and indicating, in response to the result of comparison, that operation via the first pattern is within the zone, wherein:

(a) the first and the second communication pattern each respectively has a periphery such that communication with a provided identification device that is physically located beyond the periphery is less reliable than communication with a provided identification device that is physically located within the periphery;

(b) the first communication pattern has a periphery substantially within the zone; and (c) the identification device is located beyond the periphery of the first pattern and within the periphery of the second pattern.

21. A method for preparing for zone-based communication, such communication using a portable locator, the method comprising for each zone:

determining a respective set of locations comprising at least one location, each respective location for operating the locator within the zone, all points within the zone being on at least one respective line of sight from at least one location of the set of locations; and determining a respective set of communication pattern pairs comprising at least one pattern pair, wherein:

(a) each pair respectively comprises a first pattern and a second pattern;

(b) each respective pattern, operative with the locator, has a periphery such that communication with a provided identification device that is physically located beyond the periphery is less reliable than communication with a provided identification device that is physically located within the periphery; and (c) each respective first pattern has a periphery substantially within the zone; and (d) for each pattern pair, placing at least one identification device beyond the periphery of the first pattern and within the periphery of the second pattern.

22. The method of claim 21 further comprising for each zone:

comparing reliability of communication with the identification device via the first pattern at a location in the zone and reliability of communication with the identification device via the second pattern at the location in the zone to provide a result of comparison; and indicating proper operating conditions exist for operating the portable locator via the first pattern in response to the result of comparison.

* * * * *